(12) United States Patent
Wu

(10) Patent No.: US 8,781,207 B2
(45) Date of Patent: *Jul. 15, 2014

(54) COMPUTING DEVICE AND IMAGE CORRECTION METHOD

(75) Inventor: Wen-Wu Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 454 days.

This patent is subject to a terminal disclaimer.

(21) Appl. No.: 13/211,318

(22) Filed: Aug. 17, 2011

(65) Prior Publication Data

US 2012/0148144 A1    Jun. 14, 2012

(30) Foreign Application Priority Data

Dec. 11, 2010   (CN) .......................... 2010 1 0583202

(51) Int. Cl.
*G06K 9/00* (2006.01)

(52) U.S. Cl.
USPC ............ 382/141; 382/144; 382/145; 382/147

(58) Field of Classification Search
CPC ........... G06T 2207/30141; G06T 2207/30148; G06T 7/004; G06K 9/3275

USPC .................................................. 382/141–152
See application file for complete search history.

(56) References Cited

U.S. PATENT DOCUMENTS

2010/0141755 A1*   6/2010   Iwanaga et al. ................. 348/94

* cited by examiner

*Primary Examiner* — Brian Le
(74) *Attorney, Agent, or Firm* — Novak Druce Connolly Bove + Quigg LLP

(57) ABSTRACT

A computing device reads a reference image and a real-time of a printed circuit board (PCB), determines feature points and feature information of the feature points in the reference image; and creates two 1×N matrices based on the feature points. Furthermore, a mapping matrix is determined based on the two 1×N matrices. The device determines matching points in the real-time image based on coordinates of base points in the reference image and the mapping matrix, determines a matching region the real-time image based on the matching points, and determines an angle between the matching region and an X-axis of a coordinate system. If the angle does not equal zero, the device determines that the real-time is tilted, and corrects the real-time image to obtain a corrected image by taking a center of the real-time image as a turning pivot to rotate the real-time image until the angle equals zero.

18 Claims, 5 Drawing Sheets

COMPUTING DEVICE AND IMAGE CORRECTION METHOD

BACKGROUND

1. Technical Field

Embodiments of the present disclosure relate to data processing systems and methods, and particularly to a computing device and an image correction method.

2. Description of Related Art

Automated optical inspection (AOI) is an automated visual inspection process of a wide range of products, such as printed circuit boards (PCBs). In the case of PCB inspection, a camera autonomously scans a PCB to obtain a real-time image of the PCB. Then, the real-time image is compared with a reference image from the PCB design, based on pixel information of the reference image and the real-time image, to determine a variety of surface feature defects, such as scratches and stains, missing components, and incorrectly placed components of the PCB.

The reference image is a comparison standard image of the real-time image without tilted angle with an X-axis of a coordinate system. However, one problem is that, if the PCB is not placed in a horizontal position, or the camera is not held horizontally when capturing the real-time image, the real-time image may be tilted towards the X-axis. Therefore, comparison without correction of the real-time image may have big errors.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
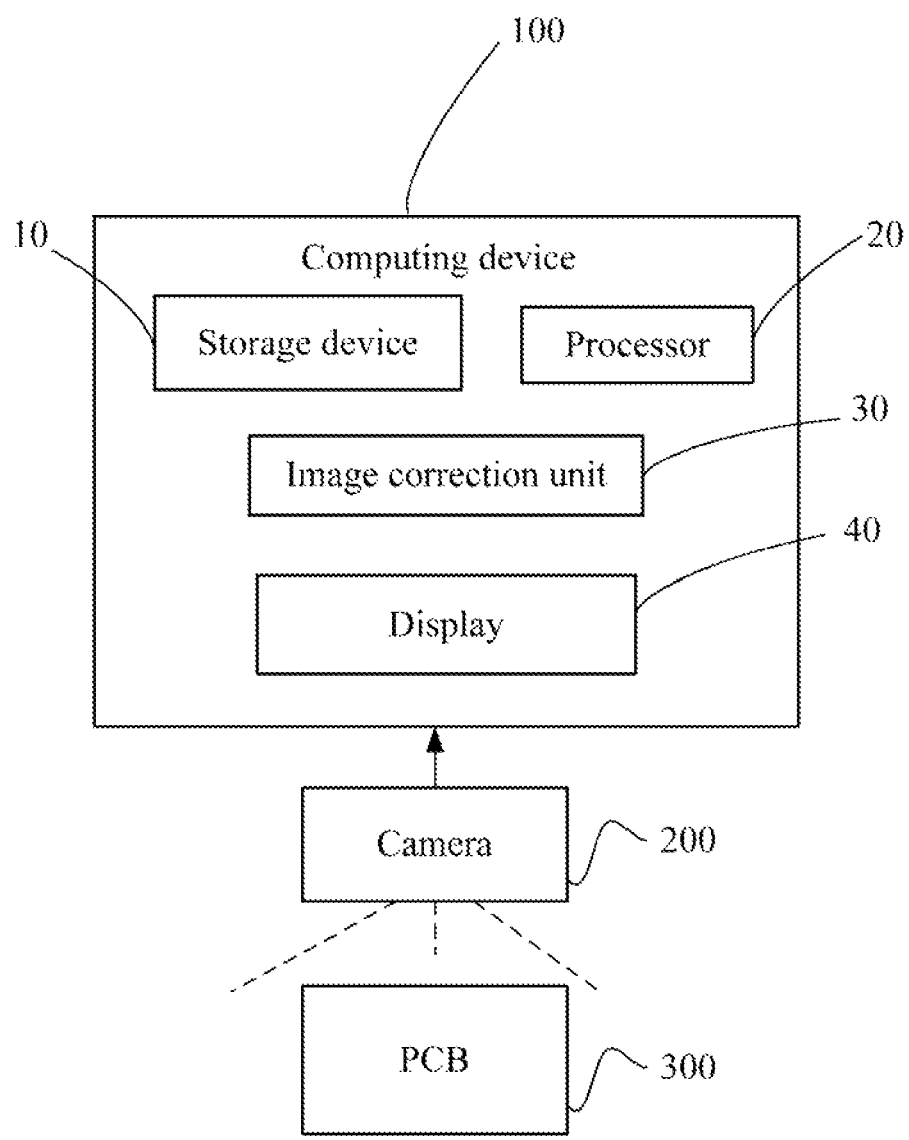
FIG. 1 is a block diagram of one embodiment of a computing device comprising an image correction unit.

FIG. 1 is a block diagram of one embodiment of a computing device 100. Depending on the embodiment, the computing device 100 may be a computer, a server, or any other data processing device. The computing device 100 is connected to a camera 200. The camera 200 captures real-time images of one or more printed circuit boards (PCB) 300 (only one shown), and sends the real-time images to the computing device 100.

In one embodiment, the computing device 100 includes a storage device 10, a processor 20, an image correction unit 30, and a display 40. The storage device 10 stores reference images of the PCBs 300 from designs of the PCBs 300, and stores the real-time images of the PCBs 300 that are captured by the camera 200. The image correction unit 30 reads a reference image and a real-time image of a PCB 300 captured by the camera 200, determines a reference region in the reference image, searches a matching region of the reference region in the real-time image, determines an angle between the matching region and an X-axis of a coordinate system, and corrects the real-time image according to the angle. The display 40 displays the reference images, the real-time images, and the correction results, such as the corrected real-time image, the corrected matching points, and the corrected matching region.

Figure 2:
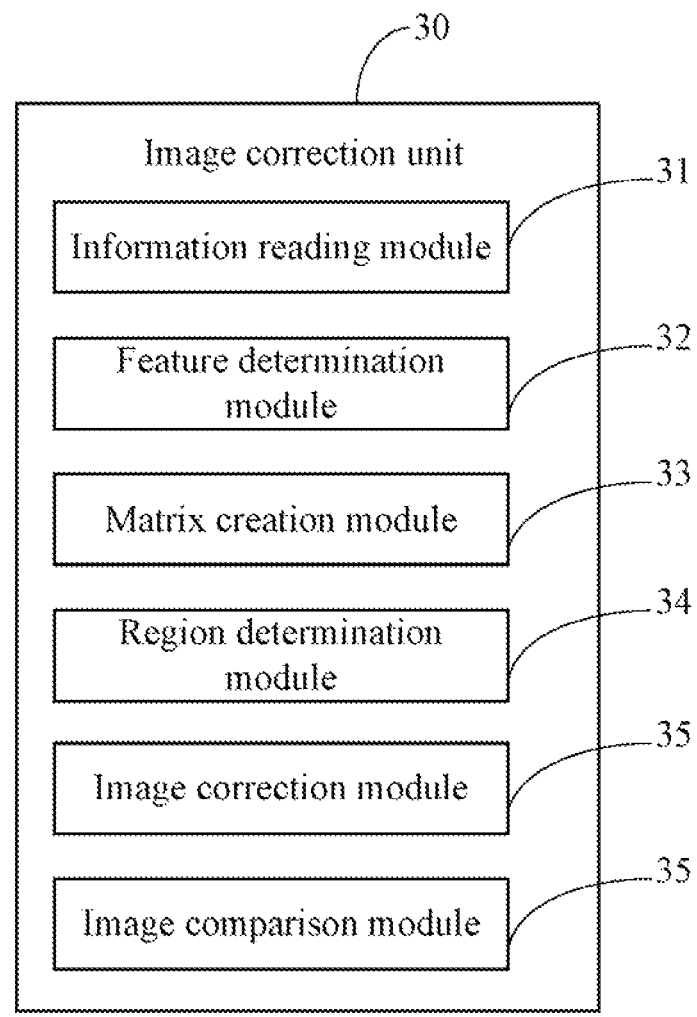
FIG. 2 is a block diagram of one embodiment of function modules of the image correction unit in FIG. 1.

As shown in FIG. 2, the image correction unit 30 includes an information reading module 31, a feature determination module 32, a matrix creation module 33, a region determination module 34, an image correction module 35, and an image comparison module 36. The modules 31-36 may comprise computerized code in the form of one or more programs that are stored in the storage device 10. The computerized code includes instructions that are executed by the processor 20, to provide the below mentioned functions of the modules 31-36 illustrated in FIG. 3.

Figure 3:
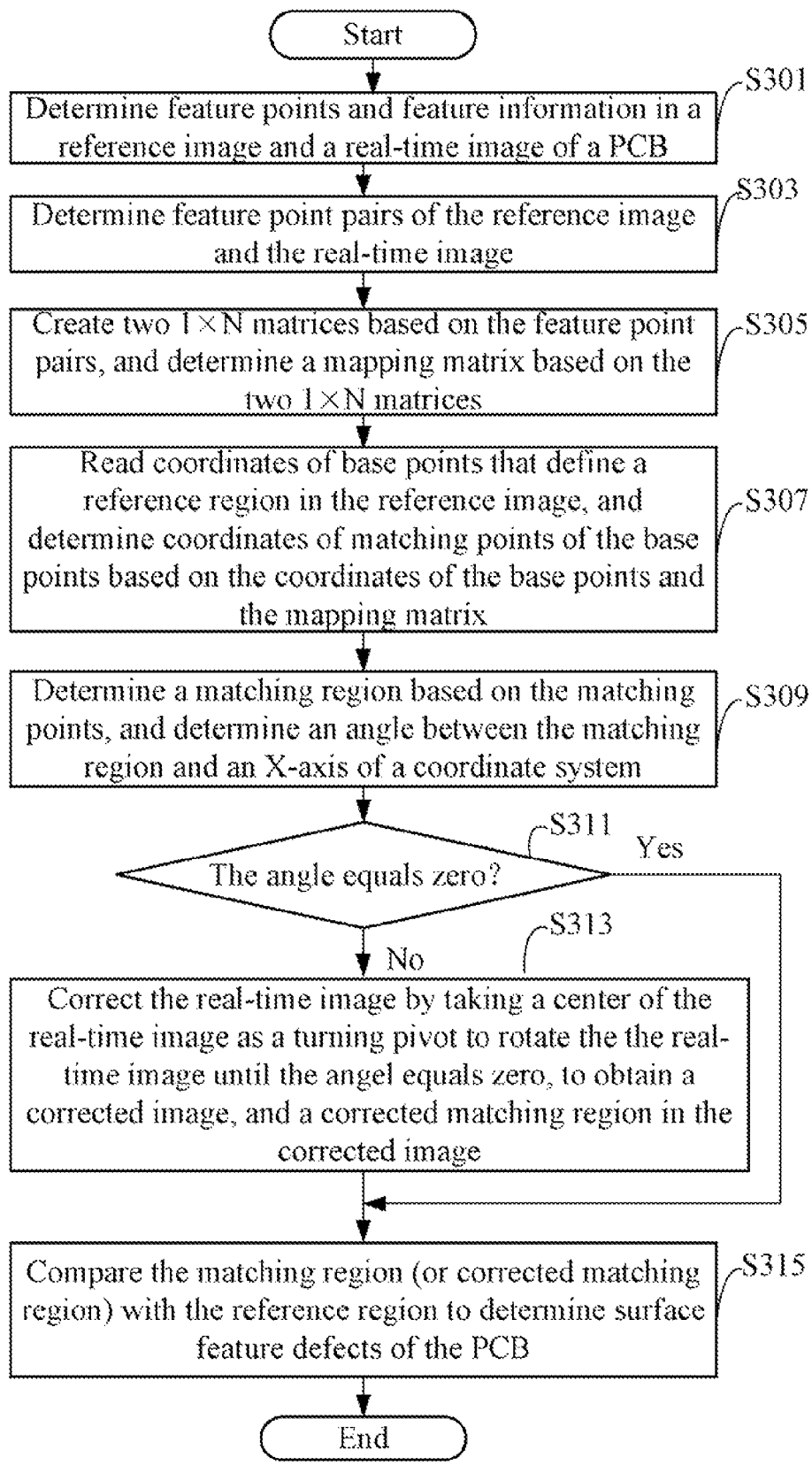
FIG. 3 is a block diagram of one embodiment of an image correction method.

FIG. 3 is a flowchart of one embodiment of an image correction method. Depending on the embodiment, additional blocks may be added, others removed, and the ordering of the blocks may be changed.

In block S301, the information reading module 31 reads a reference image and a real-time image of a PCB 300 from the storage device 10. The feature determination module 32 determines feature points in the reference image and the real-time image, and determines feature information of the feature points using a mathematic algorithm. In one embodiment, the reference image and the real-time image are two-dimensional images. In one example, the mathematic algorithm is a speeded up robust features (SURF) algorithm. The feature points are pixels whose eigenvalues are more than a predetermined eigenvalue. Feature information of a feature point may include a direction, a scale, and a feature vector of the feature point. In other embodiment, the mathematic algorithm may be a scale-invariant feature transform (SIFT) algorithm.

In block S303, the feature determination module 32 determines feature point pairs of the reference image and the real-time image based on the feature information of the feature points. It is understood that, a feature point pair consist of a feature point (e.g., Q1 shown in FIG. 4) in the reference image and a corresponding feature point (e.g., P1 shown in FIG. 5) in the real-time image. In this embodiment, the feature determination module 32 determines similarity of the feature points in the reference image and the real-time image according to the Euclidean distances of the feature vectors of the feature points. For example, the feature determination module 32 reads a feature point A1 from the reference image, searches two feature points B1 and B2 in the real-time image, where the feature point B1 has a nearest Euclidean distance D1 between the feature point A1, and the feature point B2 has a less nearest Euclidean distance D2 between the feature point A1. If a ratio of the nearest Euclidean distance D1 to the less nearest Euclidean distance D2 is less than a predetermined value (e.g., 0.8), the feature determination module 32 determines the feature point A1 and the feature point B1 are a feature point pair.

In block S305, the matrix creation module 33 creates two 1×N matrices based on the feature point pairs. For example, supposing there are n feature point pairs (A1, B1), (A2, B2), (A3, B3), ..., (AN, BN), where A1-AN are feature points in the reference image, and B1-Bn are feature points in the real-time image, so the matrix creation module 33 creates a first 1×N matrix A=[A1, A2, A3, ..., AN], and a second 1×N matrix B=[B1, B2, B3, ..., BN]. Furthermore, the matrix creation module 33 determines a mapping matrix based on the two 1×N matrices. For example, the matrix creation module 33 determines a mapping matrix E based on a formula A×E=B.

Figure 4:
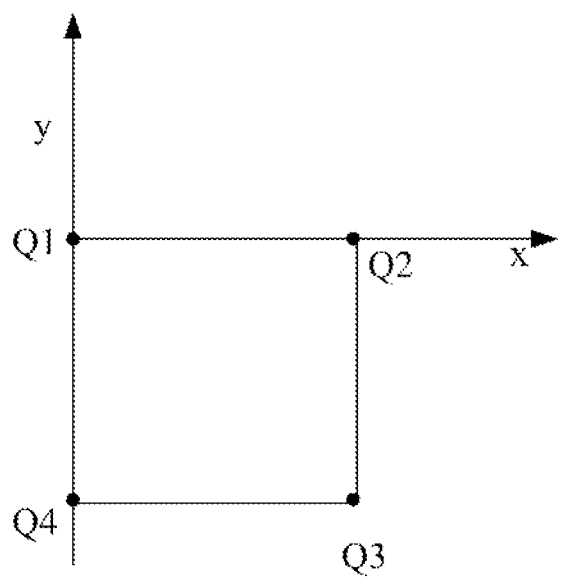
FIG. 4 illustrates an example of base points in a reference image of a PCB.
Figure 5:
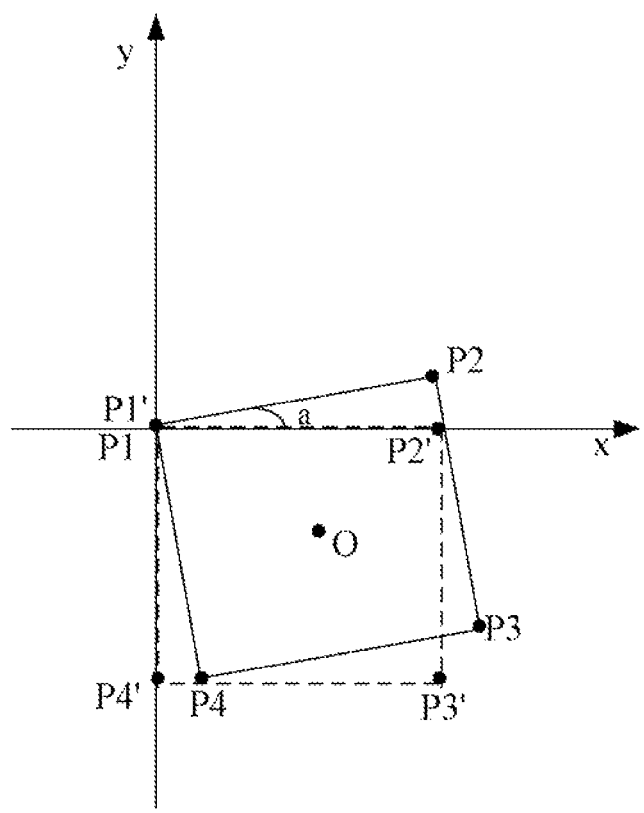
FIG. 5 illustrates an example of matching points of the base points in a real-time image of the PCB.

In block S307, the information reading module 31 reads coordinates of base points designated in the reference image. The base points are used to define a reference region in the reference image, and may be selected from the feature points in the reference image, or any other suitable pixels in the reference image. In one embodiment, as shown in FIG. 4, four base points Q1 (0, 0), Q2 (w, 0), Q3 (w, h), Q4 (0, h) are designated, where w>0, h>0. The base point Q1 (0, 0) is an origin of a two-dimensional coordinate system, w represents the width of the reference image, and h represents the height of the reference image. The region determination module 34 determines coordinates of matching points for the base points in the real-time image based on the coordinates of the base points and the mapping matrix. For example, if the matching points for the base points Q1, Q2, Q3, and Q4 are P1, P2, P3, and P4 (as shown in FIG. 5), then Q1×E=P1, Q2×E=P2, Q3×E=P3, Q4×E=P4.

In block S309, the region determination module 34 determines a matching region of the reference region based on the matching points. For example, a rectangle P1P2P3P4 is determined as the matching region for the reference region Q1Q2Q3Q4. The image correction module 35 determines an angle between the matching region and an X-axis of the two-dimensional coordinate system, for example, the angle "a" between the matching region P1P2P3P4 and the X-axis is determined.

In block S311, the image correction module 35 determines if the angle between the matching region and the X-axis equals zero, to determine if the real-time image is tilted. If the angle between the matching region and the X-axis equals zero, the image correction module 35 determines that the real-time image is not tilted and therefore no correction is needed, the procedure goes to block S315. In block S315, the image comparison module 36 compares the matching region with the reference region, to determine surface feature defects of the PCB 300. Otherwise, if the angle between the matching region and the X-axis does not equal zero, for example, the angle "a" between the matching region P1P2P3P4 and the X-axis may be 15 degrees, the procedure goes to block S313.

In block S313, the image correction module 35 takes a center of the real-time image as a turning pivot to rotate the real-time image until the angle equal zero, to correct the real-time image for obtaining a corrected image, the corrected matching points and the corrected matching region in the corrected image. For example, as shown in FIG. 5, the real-time image is rotated by "a" degrees clockwise by taking the center P as the turning pivot, the corrected matching points P1, P2', P3', P4' are determined, and a rectangle P1P2'P3'P4' is determined as the corrected matching region.

In block S315, the image comparison module 36 compares the corrected matching region (e.g., the rectangle P1P2'P3'P4') in the corrected image with the reference region (e.g., the rectangle Q1Q2Q3Q4) in the reference image, to determine surface feature defects of the PCB 300.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based image correction method being performed by execution of computer readable program code by a processor of a computing device, the method comprising:
   reading a reference image of a printed circuit board (PCB) from a design of the PCB, and reading a real-time image of the PCB captured by a camera by the processor;
   determining feature points and feature information of the feature points in the reference image using a mathematic algorithm by the processor;
   determining feature point pairs of the reference image and the real-time image based on the feature information of the feature points, wherein a feature point pair consists of a feature point in the reference image and a corresponding feature point in the real-time image by the processor;
   creating two 1×N matrices based on the feature point pairs, and determining a mapping matrix based on the two 1×N matrices by the processor;
   reading coordinates of base points that define a reference region in the reference image, and determining matching points in the real-time image based on the coordinates of the base points and the mapping matrix by the processor;
   determining a matching region in the real-time image based on all the matching points, and determining an angle between the matching region and an X-axis of a coordinate system by the processor;
   determining the real-time image is tilted on condition that the angle does not equal zero by the processor; and
   correcting the real-time image to obtain a corrected image by taking a center of the real-time image as a turning pivot to rotate the real-time image until the angle equals zero.

2. The method of claim 1, further comprising:
   comparing the reference region in the reference image and a corrected matching region in the corrected image to determine surface feature defects of the PCB.

3. The method of claim 1, further comprising: determining the real-time image is put in a right position and no correction is needed on condition that the angle equal zero.

4. The method of claim 1, wherein the feature points are pixels whose eigenvalues are more than a predetermined eigenvalue.

5. The method of claim 1, wherein the feature information of a feature point comprises a direction, a scale, and a feature vector of the feature point.

6. The method of claim 5, wherein the feature point pairs are determined according to similarity between the feature points in the reference image and the real-time image, and the similarity of the feature points in the reference image and the real-time image are determined according to Euclidean distances of the feature vectors of the feature points.

7. A non-transitory computer-readable medium storing a set of instructions, the set of instructions capable of being executed by processors to perform an image correction method, the method comprising:
   reading a reference image of a printed circuit board (PCB) from a design of the PCB, and reading a real-time image of the PCB captured by a camera;

determining feature points and feature information of the feature points in the reference image using a mathematic algorithm;

determining feature point pairs of the reference image and the real-time image based on the feature information of the feature points, wherein a feature point pair consists of a feature point in the reference image and a corresponding feature point in the real-time image;

creating two 1×N matrices based on the feature point pairs, and determining a mapping matrix based on the two 1×N matrices;

reading coordinates of base points that define a reference region in the reference image, and determining matching points in the real-time image based on the coordinates of the base points and the mapping matrix;

determining a matching region in the real-time image based on all the matching points, and determining an angle between the matching region and an X-axis of a coordinate system;

determining the real-time image is tilted on condition that the angle does not equal zero; and correcting the real-time image to obtain a corrected image by taking a center of the real-time image as a turning pivot to rotate the real-time image until the angle equals zero.

8. The non-transitory computer-readable medium of claim 7, wherein the method further comprises:
comparing the reference region in the reference image and a corrected matching region in the corrected image to determine surface feature defects of the PCB.

9. The non-transitory computer-readable medium of claim 7, wherein the method further comprises:
determining the real-time image is put in a right position and no correction is needed on condition that the angle equal zero.

10. The non-transitory computer-readable medium of claim 7, wherein the feature points are pixels whose eigenvalues are more than a predetermined eigenvalue.

11. The non-transitory computer-readable medium of claim 7, wherein the feature information of a feature point comprises a direction, a scale, and a feature vector of the feature point.

12. The non-transitory computer-readable medium of claim 11, wherein the feature point pairs are determined according to similarity between the feature points in the reference image and the real-time image, and the similarity of the feature points in the reference image and the real-time image are determined according to Euclidean distances of the feature vectors of the feature points.

13. A computing device, comprising:
a storage device;
a processor; and
one or more programs stored in the storage device and executable by the processor, the one or more programs comprising:

an information reading module operable read a reference image of a printed circuit board (PCB) from a design of the PCB, and read a real-time image of the PCB captured by a camera;

a feature determination module operable to determine feature point pairs of the reference image and the real-time image based on the feature information of the feature points, wherein a feature point pair consists of a feature point in the reference image and a corresponding feature point in the real-time image;

a matrix creation module operable to create two 1×N matrices based on the feature point pairs, and determine a mapping matrix based on the two 1×N matrices;

a region determination module operable to determine matching points in the real-time image based on coordinates of base points that define a reference region in the reference image and the mapping matrix, and determine a matching region in the real-time image based on all the matching points; and an image correction module operable to determine an angle between the matching region and an X-axis of a coordinate system, determine the real-time image is tilted on condition that the angle does not equal zero, and correct the real-time image to obtain a corrected image by taking a center of the real-time image as a turning pivot to rotate the real-time image until the angle equals zero.

14. The computing device of claim 13, wherein the one or more programs further comprise:
an image comparison module operable to compare the reference region in the reference image and a corrected matching region in the corrected image to determine surface feature defects of the PCB.

15. The computing device of claim 13, wherein the image correction module is further operable to determine the real-time image is put in a right position and no correction is needed on condition that the angle equal zero.

16. The computing device of claim 13, wherein the feature points are pixels whose eigenvalues are more than a predetermined eigenvalue.

17. The computing device of claim 13, wherein the feature information of a feature point comprises a direction, a scale, and a feature vector of the feature point.

18. The computing device of claim 17, wherein the feature point pairs are determined according to similarity between the feature points in the reference image and the real-time image, and the similarity of the feature points in the reference image and the real-time image are determined according to Euclidean distances of the feature vectors of the feature points.

* * * * *